(12) United States Patent
Mayuzumi et al.

(10) Patent No.: US 11,358,669 B2
(45) Date of Patent: Jun. 14, 2022

(54) SADDLE RIDING VEHICLE

(71) Applicant: HONDA MOTOR CO., LTD., Tokyo (JP)

(72) Inventors: Kei Mayuzumi, Wako (JP); Keita Mikura, Wako (JP); Masaomi Yamada, Wako (JP); Kazuya Sawasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 27 days.

(21) Appl. No.: 16/578,503

(22) Filed: Sep. 23, 2019

(65) Prior Publication Data

US 2020/0102035 A1 Apr. 2, 2020

(30) Foreign Application Priority Data

Sep. 28, 2018 (JP) .............................. JP2018-183888

(51) Int. Cl.
*B62J 35/00* (2006.01)
*B62K 11/04* (2006.01)
*B62K 19/32* (2006.01)

(52) U.S. Cl.
CPC .............. *B62J 35/00* (2013.01); *B62K 11/04* (2013.01); *B62K 19/32* (2013.01)

(58) Field of Classification Search
CPC .......... B62J 35/00; B62K 11/00; B62K 11/02; B62K 11/04; B62K 19/32
See application file for complete search history.

(56) References Cited

U.S. PATENT DOCUMENTS

| | | | | |
|---|---|---|---|---|
| 6,213,514 B1* | 4/2001 | Natsume | .................. | B62M 6/55 280/833 |
| 7,451,745 B2* | 11/2008 | Okazaki | .................. | B62J 35/00 123/509 |
| 8,500,169 B2* | 8/2013 | Aoki | ........................ | B62J 35/00 280/835 |
| 9,533,726 B2* | 1/2017 | Kunisada | ............... | B60K 15/05 |
| 9,944,342 B2* | 4/2018 | Hirano | ..................... | B62J 23/00 |

(Continued)

FOREIGN PATENT DOCUMENTS

CN 201834134 5/2011
CN 203666874 6/2014

(Continued)

OTHER PUBLICATIONS

Chinese Office Action for Chinese Patent Application No. 201910891211.1 dated Oct. 10, 2020.

(Continued)

*Primary Examiner* — Tony H Winner
*Assistant Examiner* — Michael R Stabley
(74) *Attorney, Agent, or Firm* — Amin, Turocy & Watson, LLP

(57) ABSTRACT

A saddle riding vehicle includes a head pipe, left and right main frame pipes, a fuel tank supported on the left and right main frame pipes, an upper gusset plate provided between the left and right main frame pipes, a lower gusset plate provided below the upper gusset plate with an interval, a stay attached to the lower gusset plate below the upper gusset plate, and a fastening bolt configured to detachably fasten the lower gusset plate and the stay.

8 Claims, 11 Drawing Sheets

(56) References Cited

U.S. PATENT DOCUMENTS

| | | | |
|---|---|---|---|
| 2005/0279330 A1* | 12/2005 | Okazaki | B62J 35/00 |
| | | | 123/509 |
| 2007/0193805 A1 | 8/2007 | Adachi et al. | |
| 2016/0264206 A1 | 9/2016 | Ishii et al. | |
| 2017/0101151 A1 | 4/2017 | Koishikawa et al. | |
| 2018/0086408 A1 | 3/2018 | Yamamoto | |
| 2018/0272857 A1 | 9/2018 | Matsushima | |
| 2019/0248436 A1* | 8/2019 | Matsushima | B60K 15/04 |
| 2019/0248437 A1* | 8/2019 | Matsushima | B60K 15/07 |

FOREIGN PATENT DOCUMENTS

| | | |
|---|---|---|
| JP | 56-098676 | 8/1981 |
| JP | 57-072383 | 5/1982 |
| JP | 60-072383 | 5/1985 |
| JP | 62-216884 | 9/1987 |
| JP | 63-28777 | 2/1988 |
| JP | 03-20076 | 1/1991 |
| JP | 04-137972 | 12/1992 |
| JP | 05-008780 | 1/1993 |
| JP | 09-076972 | 3/1997 |
| JP | 2002-104109 | 4/2002 |
| JP | 2004-182017 | 7/2004 |
| JP | 2010-208437 | 9/2010 |
| JP | 2014-113911 | 6/2014 |
| JP | 2018-052470 | 4/2018 |
| WO | 2011/118327 | 9/2011 |

OTHER PUBLICATIONS

Indian Office Action for Indian Patent Application No. 201944038638 dated Mar. 9, 2021.

Japanese Office Action for Japanese Patent Application No. 2018-183888 dated Aug. 10, 2021.

Japanese Notice of Allowance for Japanese Patent Application No. 2018-183888 dated Dec. 7, 2021.

* cited by examiner

SADDLE RIDING VEHICLE

CROSS-REFERENCE TO RELATED APPLICATION

Priority is claimed on Japanese Patent Application No. 2018-183888, filed Sep. 28, 2018, the content of which is incorporated herein by reference.

BACKGROUND OF THE INVENTION

Field of the Invention

The present invention relates to a saddle riding vehicle.

Description of Related Art

In general, vehicle configuration parts such as a fuel tank and the like disposed in front of a seat of a saddle riding vehicle are supported by a vehicle body frame. For example, Japanese Unexamined Patent Application, First Publication No. 2018-52470 discloses a configuration in which a protrusion for attachment to a vehicle body frame is formed on a front end portion of a fuel tank. The vehicle body frame disclosed in Japanese Unexamined Patent Application, First Publication No. 2018-52470 includes a pair of left and right main frames disposed behind a head pipe while the head pipe having provided on front end portions thereof, and includes a cross part configured to connect the front end portions of the left and right main frames. The protrusion of the fuel tank is fastened to the cross part of the vehicle body frame by a bolt via a grommet and a collar.

SUMMARY OF THE INVENTION

However, in the related art, fastening portions (a bolt, a grommet, a collar, and the like) configured to support a front end portion of a fuel tank on a vehicle body frame are exposed to above a vehicle behind a head pipe and in front of the fuel tank. For this reason, during manufacture or a maintenance work of the vehicle, tools, parts, or the like, may come in contact with the fastening portions to cause damage to each other. In addition, the fastening portions of the fuel tank can be easily seen from a riding position or the like, and design properties may be impaired.

An aspect of the present invention is directed to providing a saddle riding vehicle having fastening portions of vehicle configuration parts behind a head pipe and in front of the vehicle configuration parts, and in which design properties around the fastening portions are improved while suppressing contact of external elements with the fastening portions.

The present invention employs the following aspects.

(1) A saddle riding vehicle according to an aspect of the present invention includes a head pipe; a pair of left and right vehicle body frame elements extending rearward from the head pipe; a vehicle configuration part supported on the pair of left and right vehicle body frame elements; a plate member that is disposed in front of the vehicle configuration parts with respect to the vehicle, that is provided above the pair of left and right vehicle body frame elements and that is provided between the pair of left and right vehicle body frame elements; a lower member that is provided below the plate member at an interval therefrom and that is provided between the pair of left and right vehicle body frame elements; a stay that extends from the vehicle configuration parts toward a front side of the vehicle and that is attached to the lower member below the plate member; and a fastening member configured to detachably fasten the lower member and the stay.

(2) In the aspect of the above-mentioned (1), a section to be fastened to which the fastening member is fastened may be provided on the lower member.

(3) In the aspect of the above-mentioned (1) or (2), an insertion hole, through which a tool configured to fasten the fastening member to the lower member is able to be inserted, may be formed in the plate member.

(4) In the aspect of the above-mentioned (3), the saddle riding vehicle may further include a cover member that is detachably mounted on the insertion hole and that is configured to cover the insertion hole.

(5) In the aspect of any one of the above-mentioned (1) to (4), the plate member may be an upper gusset plate that is disposed behind the head pipe with respect to the vehicle and that is configured to connect the pair of left and right vehicle body frame elements.

(6) In the aspect of any one of the above-mentioned (1) to (5), the lower member may be a lower gusset plate that is disposed behind the head pipe with respect to the vehicle and that is configured to connect the pair of left and right vehicle body frame elements.

(7) In the aspect of any one of the above-mentioned (1) to (6), a connecting member that is disposed behind the plate member with respect to the vehicle and that is configured to connect the pair of left and right vehicle body frame elements may be provided, and the stay may be disposed below the plate member through a space between the plate member and the connecting member.

(8) In the aspect of any one of the above-mentioned (1) to (7), the stay may extend in a forward/rearward direction of the vehicle, and a longitudinal intermediate section of the stay may be curved in an arc shape when seen in a side view, and a reinforcement concave section recessed toward at least one of the sides above and below may be formed in the longitudinal intermediate section.

(9) In the aspect of any one of the above-mentioned (1) to (8), a front end of the vehicle configuration part in the forward/rearward direction of the vehicle may be disposed in front of and above a rear end of the plate member with respect to the vehicle.

(10) In the aspect of any one of the above-mentioned (1) to (9), the vehicle configuration part may be a fuel tank.

According to the aspect of the above-mentioned (1), the stay extending forward from the vehicle configuration part with respect to the vehicle is attached to the lower member by the fastening member or the like at below the plate member provided between the upper sides of the pair of left and right vehicle body frame elements. Accordingly, the upper side of the portion by which the stay is fastened to the lower member is covered with the plate member. Accordingly, exposure of the portion of the stay fastened to the lower member toward above the vehicle is suppressed. As a result, contact between tools or external elements such as other articles or the like and the fastening portion between the stay and the lower member, during manufacture of the vehicle, maintenance work, or the like, is suppressed. For this reason, damage to the external elements and the fastening portion from each other can be suppressed. In addition, the fastening portion of the stay configured to support the front end portion of the vehicle configuration part on the vehicle body cannot be easily seen by an occupant or the like who rides on the saddle riding vehicle, and design properties around the front end portions of the vehicle configuration parts can be enhanced.

According to the aspect of the above-mentioned (2), since the section to be fastened is provided on the lower member, the fastening member may be fastened to the section to be fastened provided on the lower member. Accordingly, in comparison with the case in which a separate non-fastening member is used, fastening work of the fastening member and the member to be fastened can be easily and reliably performed.

According to the aspect of the above-mentioned (3), since the insertion hole for a tool is formed in the plate member, the tool for fastening the fastening member can reach the lower member from the insertion hole. Accordingly, fastening work or the like between the stay and the fastening member disposed below the plate member can be easily performed.

According to the aspect of the above-mentioned (4), except for in the case in which the tool is inserted through the insertion hole, design properties can be enhanced by covering the insertion hole with the cover member.

According to the aspect of the above-mentioned (5), the reinforcement element of the vehicle body frame can be used as a plate member that hides the fastening portion between the stay and the fastening member by using the upper gusset plate configured to connect the left and right vehicle body frame elements as the plate member. Accordingly, an increase in the number of parts can be minimized.

According to the aspect of the above-mentioned (6), the reinforcement element of the vehicle body frame can be used as the lower member that fastens the stay by using the lower gusset plate configured to connect the left and right vehicle body frame elements as the lower member. Accordingly, an increase in the number of parts can be minimized.

According to the aspect of the above-mentioned (7), since the stay passes through the space between the connecting member and the plate member provided behind the plate member with respect to the vehicle, the stay can be efficiently disposed using a limited space.

According to the aspect of the above-mentioned (8), since the longitudinal intermediate section of the stay is curved in an arc shape and the reinforcement concave section is provided on the longitudinal intermediate section, the stay can be effectively reinforced and the vehicle configuration parts can be strongly supported.

According to the aspect of the above-mentioned (9), since the front ends of the vehicle configuration parts in the forward/rearward direction of the vehicle are disposed in front of and above the rear end of the plate member with respect to the vehicle, the fastening portion between the stay and the fastening member cannot be easily seen by an occupant who rides on the saddle riding vehicle. As a result, design properties can be enhanced.

According to the aspect of the above-mentioned (10), since the vehicle configuration part is the fuel tank, the fastening portion of the stay configured to support the fuel tank having a large influence to the vehicle appearance cannot be easily seen, and design properties can be enhanced.

DETAILED DESCRIPTION OF THE INVENTION

Figure 1:
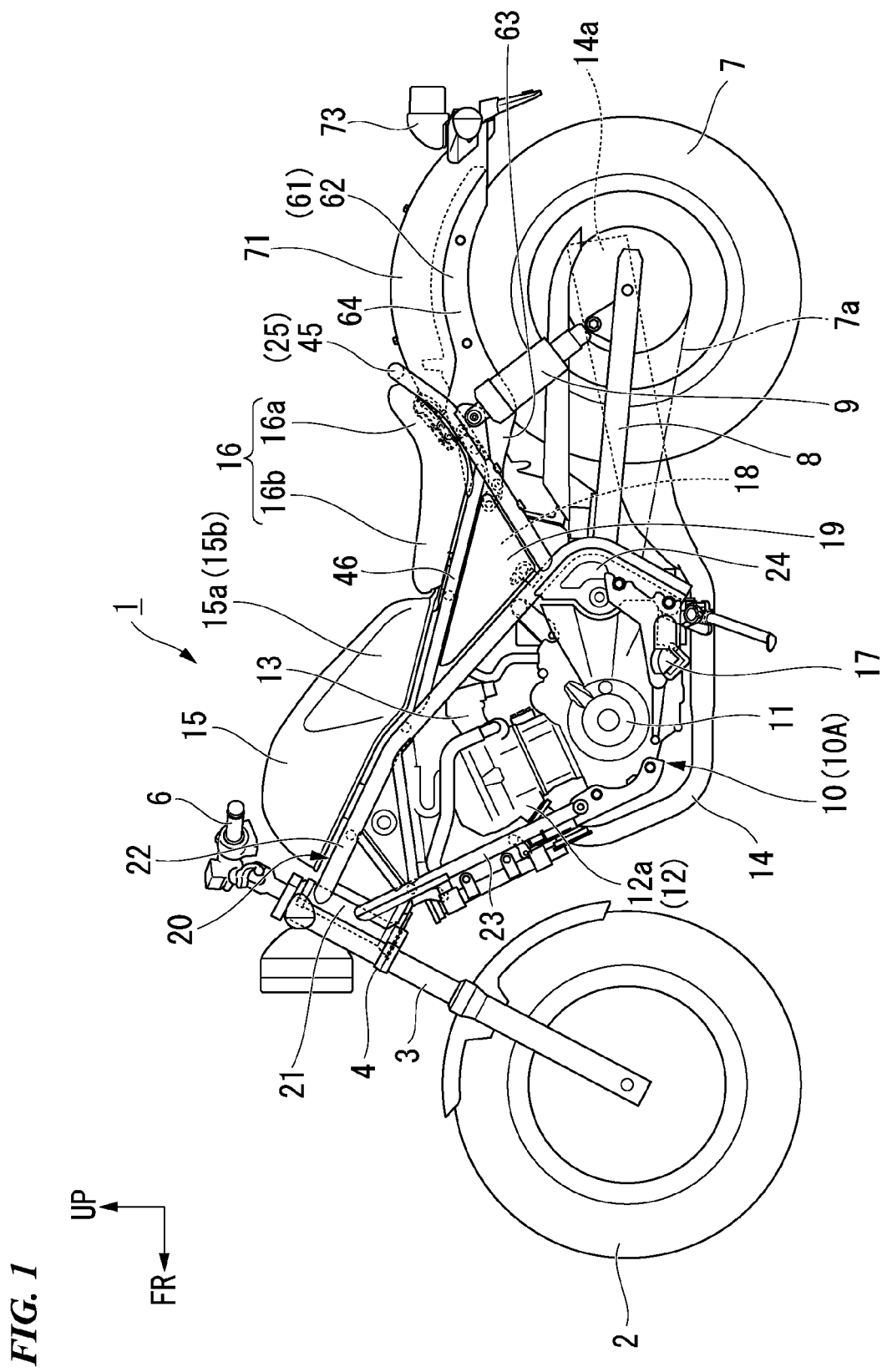
FIG. 1 is a left side view of a motorcycle according to an embodiment of the present invention.

Hereinafter, an embodiment of the present invention will be described with reference to the accompanying drawings. Further, directions of forward, rearward, leftward, rightward, and so on, in the following description are the same as directions in a vehicle described below unless the context clearly indicates otherwise. In addition, in appropriate places in the drawings used in the following description, an arrow FR indicates a forward direction with respect to a vehicle, an arrow LH indicates a leftward direction with respect to the vehicle, an arrow UP indicates an upward direction with respect to the vehicle, and a line CL indicates a lateral center of a vehicle body.

As shown in FIG. 1, a motorcycle (a saddle riding vehicle) 1 is a cruiser type vehicle obtained by making a vehicle body thereof low and long. A front wheel 2 of the motorcycle 1 is supported by lower end portions of a pair of left and right front forks 3 inclined as upper sections go rearward from a front section of the vehicle body. The upper sections of the left and right front forks 3 are supported by a front end portion of a vehicle body frame 20 via a steering stem 4. A bar handle 6 for steering is attached to an upper section of the steering stem 4.

A rear wheel 7 of the motorcycle 1 is supported by a rear end portion of a swing arm 8 extending forward and rearward below a rear section of the vehicle body. A front end portion of the swing arm 8 is vertically and swingably supported below a rear section of the vehicle body frame 20. The rear wheel 7 is connected to a power unit 10A that is a prime mover of the motorcycle 1 via, for example, a chain type transmission mechanism 7a disposed in the rear section of the vehicle body on the right side. Lower end portions of a pair of left and right rear cushions 9 are connected to rear sections of left and right arms of the swing arm 8.

The power unit 10A is mounted inside the vehicle body frame 20. The power unit 10A includes an engine (an internal combustion engine) 10 having a crankshaft provided in a vehicle width direction (a leftward/rightward direction). The engine 10 has a cylinder 12 standing upward from a front section of a crank case 11. A rear section of the crank case 11 is a gearbox case configured to accommodate a gearbox.

An intake passage 13 including a throttle section or the like is connected to a rear section of a cylinder head 12a of the cylinder 12. A base end portion of an exhaust pipe 14 is connected to a front section of the cylinder head 12a. The exhaust pipe 14 is curved rearward in front of the engine 10, routed rearward below the engine 10, and for example, connected to an exhaust muffler 14a disposed in the rear section of the vehicle body on the right side.

A fuel tank (vehicle configuration parts) 15 configured to store fuel for the engine 10 is provided above the engine 10. The fuel tank 15 is formed of, for example, a steel plate through pressing. A seat 16 on which a driver sits is disposed behind the fuel tank 15. A pair of left and right steps 17 on which a driver's feet are placed are disposed below a front side of the seat 16.

Auxiliary equipment 18 such as an air cleaner or the like is disposed below a rear section of the fuel tank 15 and a front section 16b of the seat 16. The auxiliary equipment 18 is supported inside the vehicle body frame 20, and covered with side covers 19 attached to the vehicle body frame 20 from outward to the left and right.

Further, while the motorcycle 1 of the embodiment has no seat and no step for a passenger on a rear section, the motorcycle 1 may have a configuration including this kind of seat and steps.

Figure 2:
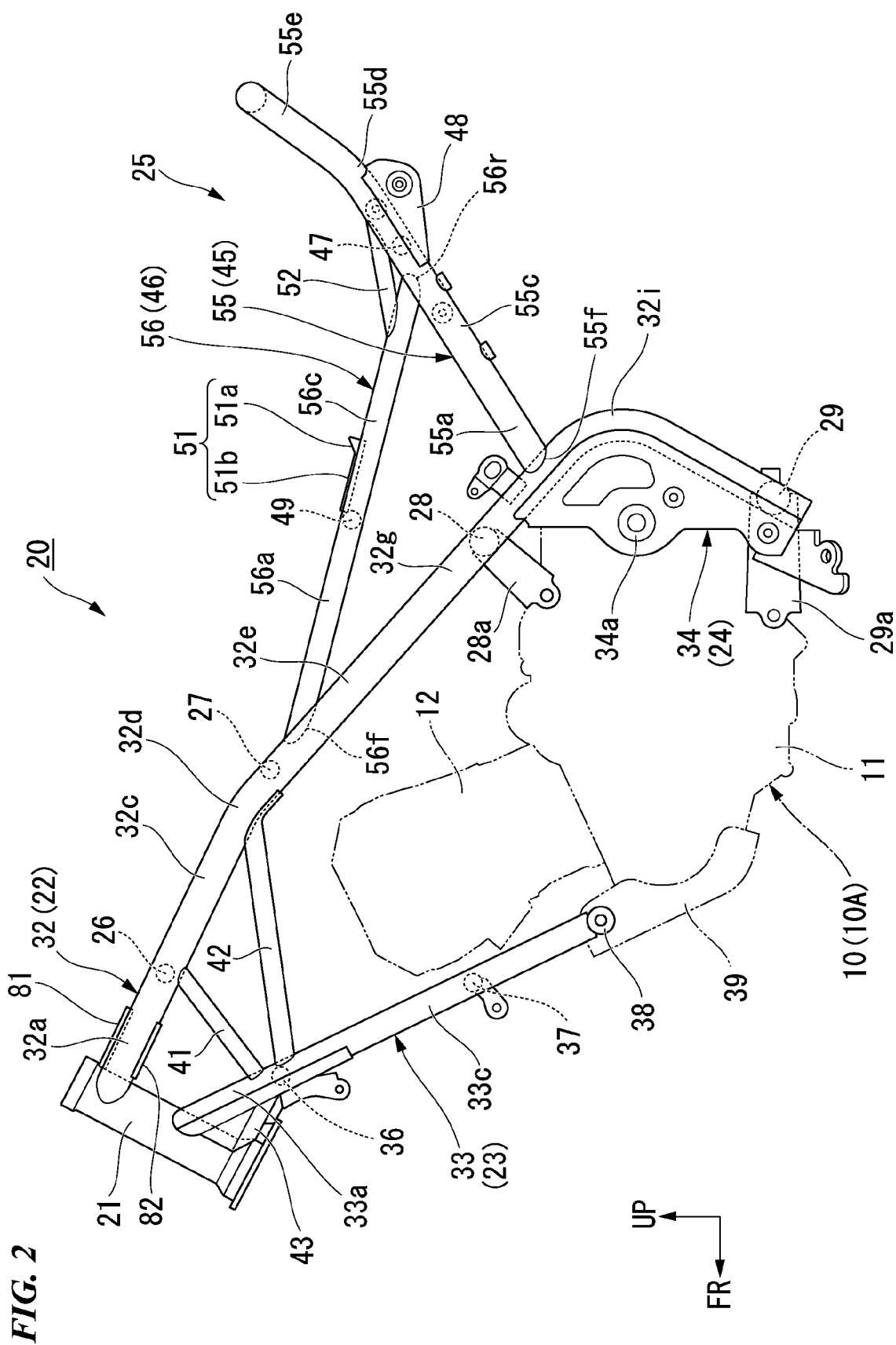
FIG. 2 is a left side view of a vehicle body frame of the motorcycle.
Figure 3:
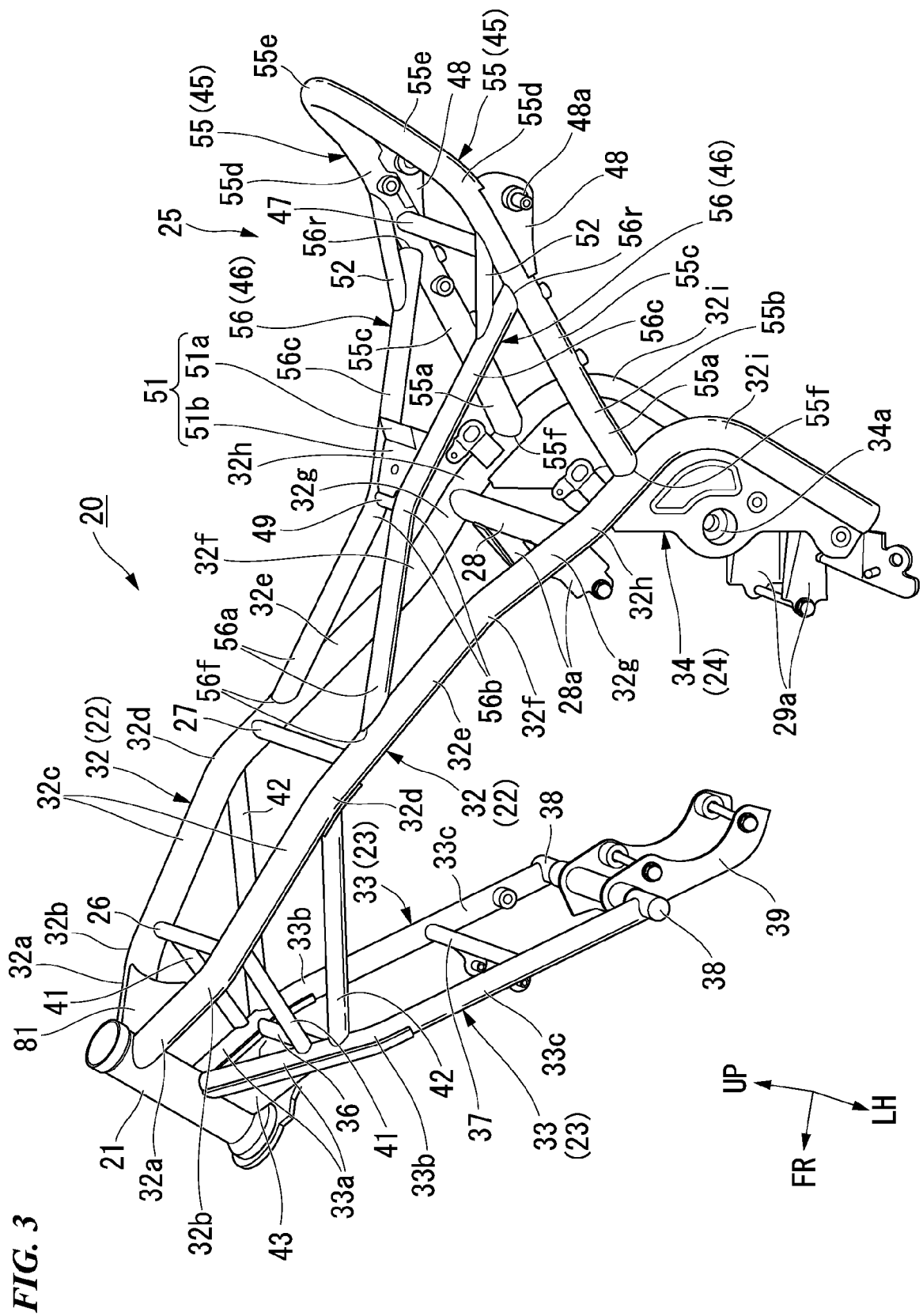
FIG. 3 is a perspective view of the vehicle body frame.
Figure 4:
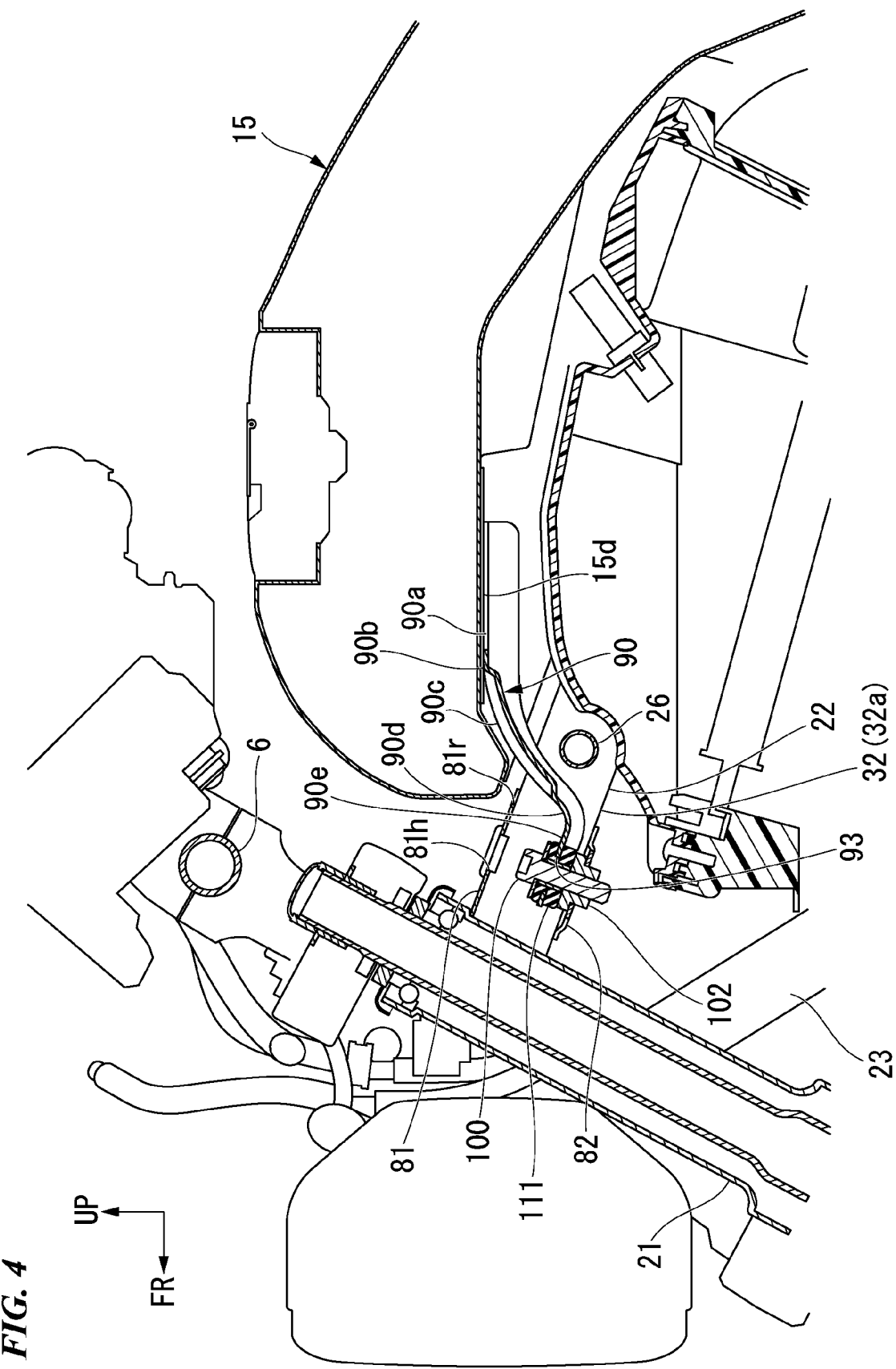
FIG. 4 is a cross-sectional view of a lateral center of a major part of the motorcycle.

Referring to FIG. 2 and FIG. 3 together, the vehicle body frame 20 is formed by integrally coupling steel members of a plurality of types through welding or the like.

The vehicle body frame 20 includes a head pipe 21 disposed on a front end portion thereof and configured to support the steering stem 4, a main frame 22 including a pair of left and right main frame pipes (vehicle body frame elements) 32 branching off from an upper rear side of the head pipe 21 toward left and right sides and extending downward and rearward when seen in a side view, a down frame 23 including a pair of left and right down frame pipes 33 branching off from a lower rear side of the head pipe 21 toward left and right sides and extending rearward and downward to form a steeper inclination than that of the main frame pipes 32 when seen in a side view, a pivot frame 24 including a pair of left and right pivot plate members 34 joined to rear sections of the left and right main frame pipes 32 and configured to support a front end portion of the swing arm 8, and a seat frame 25 that has a front end portion joined to a rear upper section of the main frame 22 and that extends rearward.

The head pipe 21 has a cylindrical shape, and a central axis is disposed at a center in the vehicle width direction and is disposed to be inclined as an upper section goes rearward when seen in a side view.

The left and right main frame pipes 32 include first extension sections 32a extending rearward from an upper rear side of the head pipe 21, extending to be inclined downward and rearward when seen in a side view and extending to be inclined outward to the left and right when seen in a plan view, second extension sections 32c continuous with rear sides of the first extension sections 32a via first bent sections 32b, extending to form a linear shape with the first extension sections 32a when seen in a side view and extending to be more gently inclined outward to the left and right than the first extension sections 32a when seen in a plan view, third extension sections 32e continuous with rear sides of the second extension sections 32c via second bent sections 32d, extending more steeply inclined downward and rearward than the second extension sections 32c when seen in a side view and extending to be inclined inward to the left and right when seen in a plan view, fourth extension sections 32g continuous with rear sides of the third extension sections 32e via third bent sections 32f, extending to form a linear shape with the third extension sections 32e when seen in a side view and extending inclined outward to the left and right when seen in a plan view, and rearward curved sections 32i continuous with rear sides of the fourth extension sections 32g via fourth bent sections 32h, extending to be curved forward and downward from a state extending in a linear shape with the fourth extension sections 32g when seen in a side view and extending to be substantially parallel to side surfaces of the vehicle body when seen in a plan view. Further, the side surfaces of the vehicle body are planes perpendicular to the vehicle width direction (the leftward/rightward direction).

The left and right main frame pipes 32 are integrally formed of round steel pipes through bending or the like.

The rearward curved sections 32i extend downward and forward in a linear shape below an area curved in an arc shape protruding rearward when seen in a side view. The pivot plate members 34 having a substantially crescent shape when seen in a side view are joined to front surface sides (inner circumferential sides) of the rearward curved sections 32i. Pivot sections 34a configured to support a swing shaft (a pivot shaft) of the swing arm 8 are provided on front sections of the left and right pivot plate members 34. The pivot plate members 34 are formed of a steel plate through pressing, casting, or the like. The rearward curved sections 32i of the left and right main frame pipes 32 also function as a part of the pivot frame 24.

A first cross frame (a connecting member) 26 bridges between front sections of the second extension sections 32c of the left and right main frame pipes 32.

A second cross frame 27 bridges between front sections of the third extension sections 32e of the left and right main frame pipes 32.

A third cross frame 28 bridges between rear sections of the fourth extension sections 32g of the left and right main frame pipes 32.

A fourth cross frame 29 bridges between lower front sections of the rearward curved sections 32i of the left and right main frame pipes 32.

The cross frames 26 to 29 are formed of round steel pipes extending in the leftward/rightward direction.

A rear upper mount bracket 28a extending forward and downward to support a rear upper side of the crank case 11 is coupled to the third cross frame 28.

A rear lower mount bracket 29a extending forward to support a rear lower side of the crank case 11 is joined to the fourth cross frame 29.

The vehicle body frame 20 is a so-called diamond frame structure using the engine 10 (the power unit 10A) as a part of the frame structure. The engine 10 is mounted to be surrounded by the main frame 22, the down frame 23 and the pivot frame 24 when seen in a side view, and connects a lower section of the down frame 23, a rear section of the main frame 22 and the pivot frame 24.

In the motorcycle 1, while the cylinder 12 of the engine 10 is not connected to the vehicle body frame 20, torsional rigidity of the vehicle body frame 20 is improved by providing the second cross frame 27 between the left and right main frame pipes 32.

The left and right down frame pipes 33 include first extension sections 33a extending rearward from a lower rear side of the head pipe 21 to be inclined downward and rearward when seen in a side view and extending to be inclined outward to the left and right when seen in a plan view, and second extension sections 33c continuous with lower sides of the first extension sections 33a via first bent sections 33b, extending to form a linear shape with the first extension sections 33a when seen in a side view and extending to be substantially parallel to side surfaces of the vehicle body when seen in a plan view.

The left and right down frame pipes 33 are integrally formed of round steel pipes through bending or the like.

A first cross frame 36 bridges between lower sections of the first extension sections 33a of the left and right down frame pipes 33.

A second cross frame 37 bridges between vertical intermediate sections of the second extension sections 33c of the left and right down frame pipes 33.

Further, "intermediate" used in the embodiment has a meaning of including a range inside between both ends of an object in addition to a center between both ends of the object.

The cross frames 36 and 37 are formed of round steel pipes extending in the leftward/rightward direction.

Cylindrical boss members 38 formed in the leftward/rightward direction are coupled to lower end portions of the left and right down frame pipes 33. An upper end portion of a front engine hanger 39 configured to support a front end portion of the crank case 11 of the engine 10 is fixed between the left and right boss members 38. The front engine hanger 39 is formed of, for example, a steel plate through pressing.

First gusset frames 41 extending to be inclined upward and rearward when seen in a side view bridge between front sections of the left and right main frame pipes 32 (front sections of the second extension sections 32c) and upper sections of the left and right down frame pipes 33 (lower sections of the first extension sections 33a).

Second gusset frames 42 extending to be more gently inclined upward and rearward than the first gusset frames 41 when seen in a side view bridge between longitudinal intermediate sections of the left and right main frame pipes 32 (the second bent sections 32d) and upper sections of the left and right down frame pipes 33 (lower sections of the first extension sections 33a) at below the left and right first gusset frames 41.

The gusset frames 41 and 42 are formed of round steel pipes extending in a linear shape.

A lower gusset 43 formed to fill an acute portion between the upper sections of the left and right down frame pipes 33 (the first extension sections 33a) and the lower section of the head pipe 21 when seen in a side view bridges therebetween. The lower section of the lower gusset 43 extends to overlap the first bent sections 33b of the left and right down frame pipes 33.

The lower gusset 43 is formed of, for example, a steel plate through pressing.

Upper gusset plates (plate members) 81 having a flat plate shape and disposed along upper edges of the main frame pipes 32 when seen in a side view and lower gusset plates (lower members) 82 having a flat plate shape and disposed along lower edges of the main frame pipes 32 when seen in a side view bridge between front sections of the left and right main frame pipes 32 (front sections of the first extension sections 32a).

Referring to FIG. 4 to FIG. 7 together, the upper gusset plates 81 are provided to cover from above a space between the first extension sections 32a of the pair of left and right main frame pipes 32 extending rearward from the head pipe 21. The upper gusset plates 81 are formed such that a width dimension in the leftward/rightward direction gradually increases from a front side toward a rear side along the left and right first extension sections 32a extending to be inclined outward to the left and right from an upper rear side to a rear side of the head pipe 21 when seen in a plan view. The upper gusset plates 81 are provided in front of the fuel tank 15.

The upper gusset plates 81 are formed of, for example, a steel plate through pressing. The upper gusset plates 81 have edge portions 81e at both end portions in the leftward/rightward direction that are joined to upper surfaces of the first extension sections 32a of the main frame pipes 32 through welding. Accordingly, the upper gusset plates 81 connect the first extension sections 32a of the pair of left and right main frame pipes 32 behind the head pipe 21.

The lower gusset plates 82 are provided to cover from below a space between the first extension sections 32a of the pair of left and right main frame pipes 32 extending rearward from the head pipe 21. The lower gusset plates 82 are disposed below the upper gusset plates 81, and provided at an interval therefrom in the upward/downward direction with the first extension sections 32a sandwiched therebetween. The lower gusset plates 82 are formed such that a width dimension in the leftward/rightward direction gradually increases from a front side toward a rear side along the left and right first extension sections 32a extending to be inclined outward to the left and right from an upper rear side to a rear side of the head pipe 21 when seen in a plan view (see FIG. 12).

The lower gusset plates 82 are formed of, for example, a steel plate through pressing. The lower gusset plates 82 have edge portions at both end portions in the leftward/rightward direction that are joined to lower surfaces of the first extension sections 32a of the main frame pipes 32 through welding. Accordingly, the lower gusset plates 82 connect the first extension sections 32a of the pair of left and right main frame pipes 32 behind the head pipe 21.

As shown in FIG. 2 and FIG. 3, the seat frame 25 includes a seat frame main body 45 including a pair of left and right side pipe sections 55 extending rearward and upward from upper sections of the rearward curved sections 32i of the left and right main frame pipes 32 toward the rear side, and a subsidiary seat frame 46 including a pair of left and right subsidiary frame pipes 56 extending rearward and downward from the longitudinal intermediate sections (the front sections of the second extension sections 32c) of the left and right main frame pipes 32 toward the rear side.

The seat frame main body 45 is formed in a U shape that opens forward when seen in a plan view, and front end portions 55f of the left and right side pipe sections 55 are joined to upper sections of the rearward curved sections 32i of the left and right main frame pipes 32, respectively.

The side pipe sections 55 include first extension sections 55a extending rearward from upper sections of the rearward curved sections 32i of the main frame pipes 32 to be inclined upward and rearward when seen in a side view and extending to be inclined inward to the left and right when seen in a plan view, second extension sections 55c continuous with rear sides of the first extension sections 55a via first bent sections 55b, extending to form a linear shape with the first extension sections 55a when seen in a side view and extending to be more gently inclined inward to the left and right than the first extension sections 55a when seen in a plan view, and rearward curved sections 55e continuous with rear sides of the second extension sections 55c via second bent sections 55d, extending to be more steeply inclined upward than the second extension sections 55c when seen in a side view, and curved in an arc shape inward to the left and right when seen in a plan view.

The left and right rearward curved sections 55e are integrally continuous with each other and formed in a semi-circular shape protruding rearward when seen in a plan view. Since the left and right rearward curved sections 55e are formed in the rear section of the seat frame main body 45 along an external form of a rear section 16*a* of the seat 16 when seen in a plan view, a load applied to the seat 16 from an occupant during acceleration of the vehicle can be supported.

The left and right side pipe sections 55 are integrally formed of round steel pipes through bending or the like.

A fifth cross frame 47 bridges between the rear sections of the second extension sections 55*c* of the left and right side pipe sections 55.

A cushion connecting bracket 48 configured to connect upper end portions of the left and right rear cushions 9 are joined to lower surface sides of the rear sections of the second extension sections 55*c* of the left and right side pipe sections 55.

The fifth cross frame 47 is formed of a round steel pipe extending in the leftward/rightward direction. The cushion connecting bracket 48 is formed of a steel plate through pressing, casting, or the like. A fastening boss 48*a* protruding outward in the vehicle width direction is provided on the connecting bracket 48.

The left and right subsidiary frame pipes 56 bridge between the front sections of the second extension sections 32*c* of the left and right main frame pipes 32 and the longitudinal intermediate sections of the second extension sections 55*c* of the left and right the side pipe sections 55. The left and right subsidiary frame pipes 56 have front end portions 56*f* coupled to the front sections of the second extension sections 32*c* of the left and right main frame pipes 32, and rear end portions 56*r* coupled to the longitudinal intermediate sections of the second extension sections 55*c* of the left and right the side pipe sections 55.

The subsidiary frame pipes 56 include first extension sections 56*a* extending rearward from the front sections of the second extension sections 32*c* of the main frame pipes 32 to be inclined downward and rearward when seen in a side view and extending to be inclined inward to the left and right when seen in a plan view, and second extension sections 56*c* continuous with rear sides of the first extension sections 56*a* via first bent sections 56*b*, extending to form a linear shape with the first extension sections 56*a* when seen in a side view and extending to be inclined outward to the left and right when seen in a plan view.

The left and right subsidiary frame pipes 56 are integrally formed of round steel pipes through bending or the like. The round steel pipes that form the left and right subsidiary frame pipes 56 have a smaller diameter than that of the round steel pipe that forms the seat frame main body 45.

A sixth cross frame 49 bridges between the first bent sections 56*b* of the left and right subsidiary frame pipes 56.

A gusset plate 51 disposed along an upper edge of the subsidiary seat frame 46 when seen in a side view bridges between the longitudinal intermediate sections of the left and right subsidiary frame pipes 56 (the front sections of the second extension sections 56*c*) and the sixth cross frame 49.

A gusset frame 52 extending to be slightly further upward and rearward than the second extension sections 55*c* of the side pipe sections 55 bridges between rear upper sides of the second extension sections 56*c* of the subsidiary frame pipes 56 and rear upper sides of the second extension sections 55*c* of the side pipe sections 55.

The cross frame and the gusset frame 52 are formed of round steel pipes, respectively. The gusset plate 51 is formed of a steel plate through pressing.

Referring also to FIG. 1, the seat 16 is supported on the seat frame 25. The seat 16 has the rear section 16*a* that is supported by the rear section of the seat frame main body 45 (the rear sections of the first extension sections 55*a* of the left and right the side pipe sections 55, the second extension sections 55*c* and the rearward curved sections 55*e*) from below and behind, and the front section 16*b* that is supported by the rear section of the subsidiary seat frame 46 (the second extension sections 56*c* of the left and right subsidiary frame pipes 56).

The rear section 16*a* of the seat 16 is formed in a wider shape overhanging outward in the vehicle width direction than the seat frame main body 45 to support an occupant's (a driver's) buttocks in a wide area.

The front section 16*b* of the seat 16 is formed in a narrow width shape having substantially the same width as a lateral width between the first bent sections 56*b* of the left and right subsidiary frame pipes 56 that form a minimum width of the subsidiary seat frame 46 to minimize opening of both legs of the occupant.

In the fuel tank 15 disposed in front of the seat 16, a tank rear section 15*b* that forms left and right knee grip sections 15*a* is formed to narrow a lateral width as it goes rearward, and easily sandwiched between both knees of a driver sitting on the seat 16. A lateral width of a rear end portion of the fuel tank 15 is substantially equal to a lateral width of a front end portion of the seat 16.

A seat front holding section 51*a* configured to hold a locking claw (not shown) provided on a seat bottom plate and inserted thereinto from behind on the front section 16*b* of the seat 16 is formed on a rear section of the gusset plate 51 between the left and right subsidiary frame pipes 56. A tank rear fastening section 51*b* configured to fasten a rear fastening flange 15*c* formed on a rear end portion of the fuel tank 15 is provided on the front section of the gusset plate 51.

A rear frame 61 including a pair of left and right rear frame main bodies 62 configured to support vehicle parts such as a rear fender 71 or the like is connected to a longitudinal intermediate section of the seat frame main body 45.

The left and right rear frame main bodies 62 are integrally formed through, for example, aluminum casting or the like. The rear frame main bodies 62 are formed in a plate shape using the leftward/rightward direction as a thickness direction.

The rear frame main bodies 62 include frame base sections 63 disposed behind and below the upper sections of the second extension sections 55*c* in the side pipe sections 55 when seen in a side view, and rear extension sections 64 extending rearward from the rear sections of the frame base sections 63 to form an arc shape protruding upward when seen in a side view.

The frame base sections 63 are provided to partially overlap a cushion connecting bracket 48 and the upper sections of the rear cushions 9 when seen in a side view. The frame base sections 63 are exposed to the vehicle appearance behind and below the seat frame main body 45 except for a portion overlapping the cushion connecting bracket 48 and the rear cushions 9. Appropriate weight reduction is performed inside the frame base sections 63 in the vehicle width direction to achieve reduction in weight while maintaining the appearance having a thickness.

The front sections of the frame base sections 63 are disposed to overlap the seat frame main body 45 when seen in a side view and fastened to the seat frame main body 45 from an inner side in the vehicle width direction by a bolt (not shown).

The rear extension sections 64 are curved along a shape of the rear fender 71 (and the rear wheel 7) supported between the left and right rear frame main bodies 62 when seen in a side view. A taillight unit 73 is supported by a rear end portion of the rear fender 71.

Referring to FIG. 4 to FIG. 8 together, the fuel tank 15 provided in front of the seat 16 is supported to be detachable with respect to the vehicle body frame 20 (mounted by a rubber member) using the rear fastening flange 15c provided on the rear lower end portion and a stay 90 provided on the front lower end portion.

Figure 8:
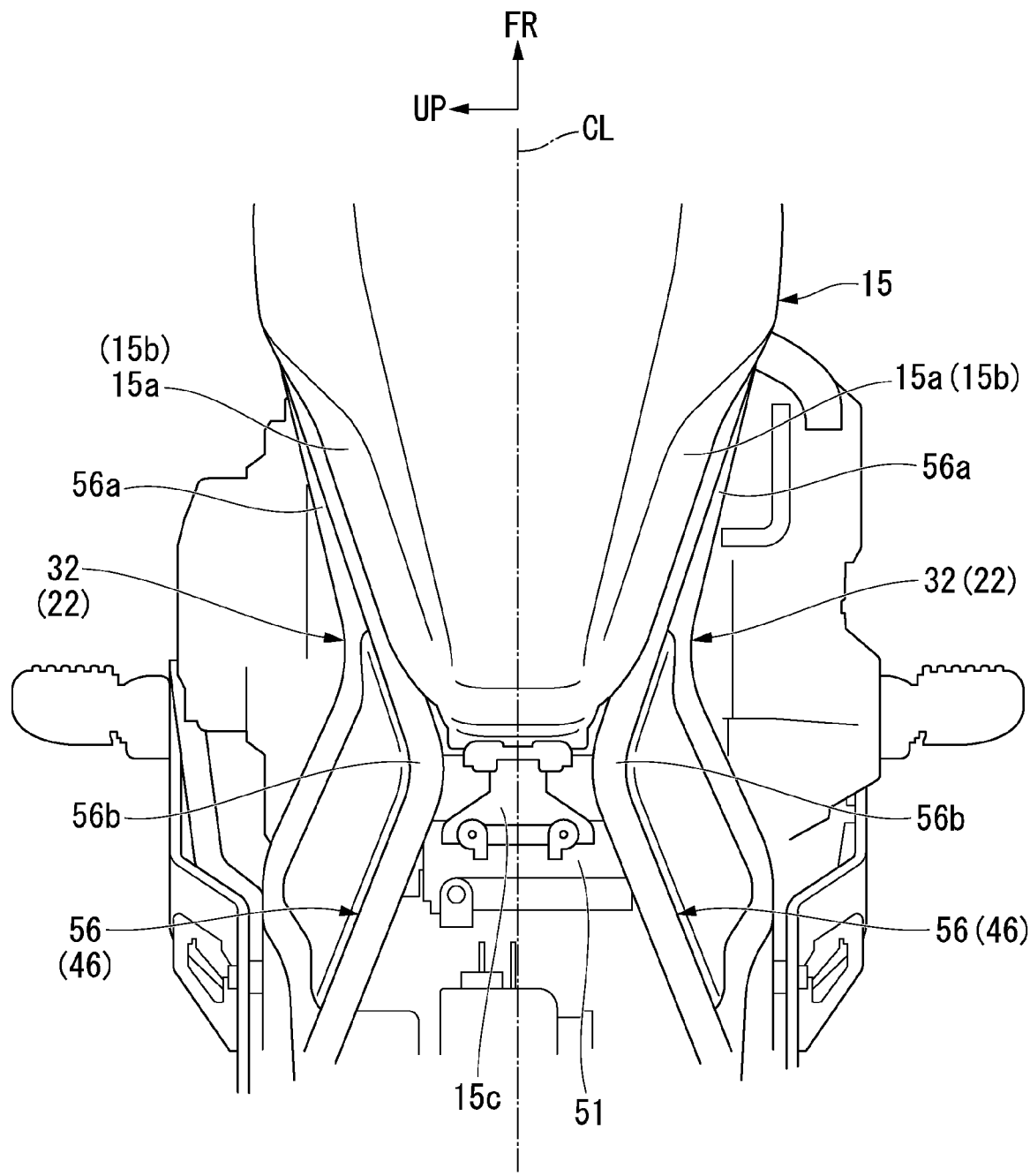
FIG. 8 is a plan view of a vicinity of a rear end portion of the fuel tank of the motorcycle.
Figure 9:
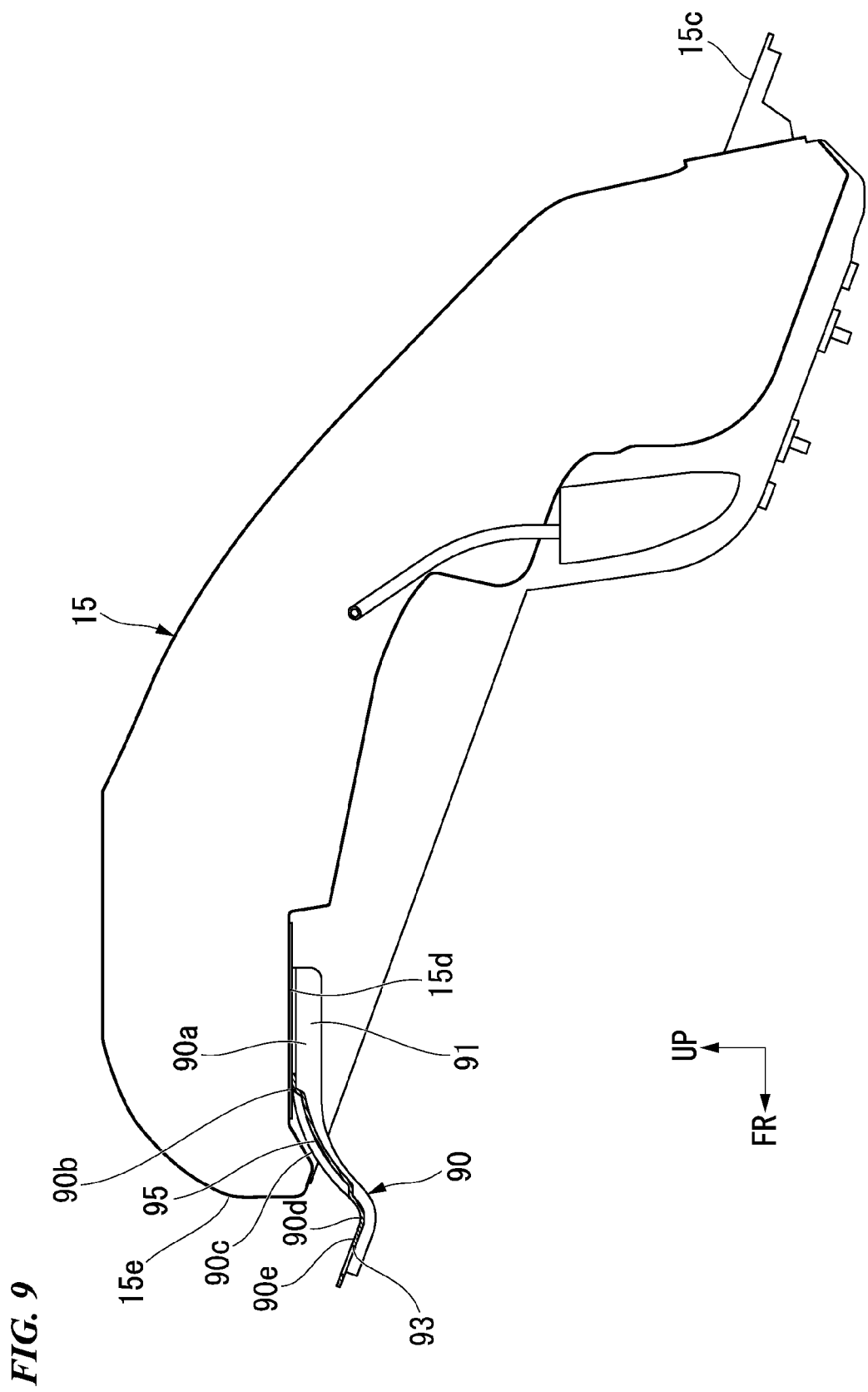
FIG. 9 is a cross-sectional view of a lateral center of the fuel tank.

As shown in FIG. 8 and FIG. 9, the rear fastening flange 15c is integrally joined to the rear lower end portion of the fuel tank 15 through welding or the like. The rear fastening flange 15c extends rearward from the rear lower end portion of the fuel tank 15 and is fastened to the tank rear fastening section 51b of the gusset plate 51 of the vehicle body frame 20 by a bolt or the like (not shown).

Referring to FIG. 4 to FIG. 6 and FIG. 9 to FIG. 11 together, the stay 90 is integrally joined to the front lower end portion of the fuel tank 15 through welding or the like. The stay 90 is provided to extend downward obliquely from the front lower end portion of the fuel tank 15 toward the front. The stay 90 includes a base end portion 90a joined to a pedestal section 15d having a planar shape formed on a lower surface of the front lower end portion of the fuel tank 15, an inclined extension section (a longitudinal intermediate section) 90c continuous with a front side of the base end portion 90a via a first bent section 90b and extending downward obliquely toward the front when seen in a side view, and a tip portion 90e continuous with a front side of an inclined extension section 90c via a second bent section 90d and extending upward obliquely toward the front when seen in a side view. The base end portion 90a is joined to the fuel tank 15 that is a hollow member via, for example, a reinforcement plate. The inclined extension section 90c is curved in an arc shape protruding forward and upward when seen in a side view, and minimizes folding of the first bent section 90b.

Figure 5:
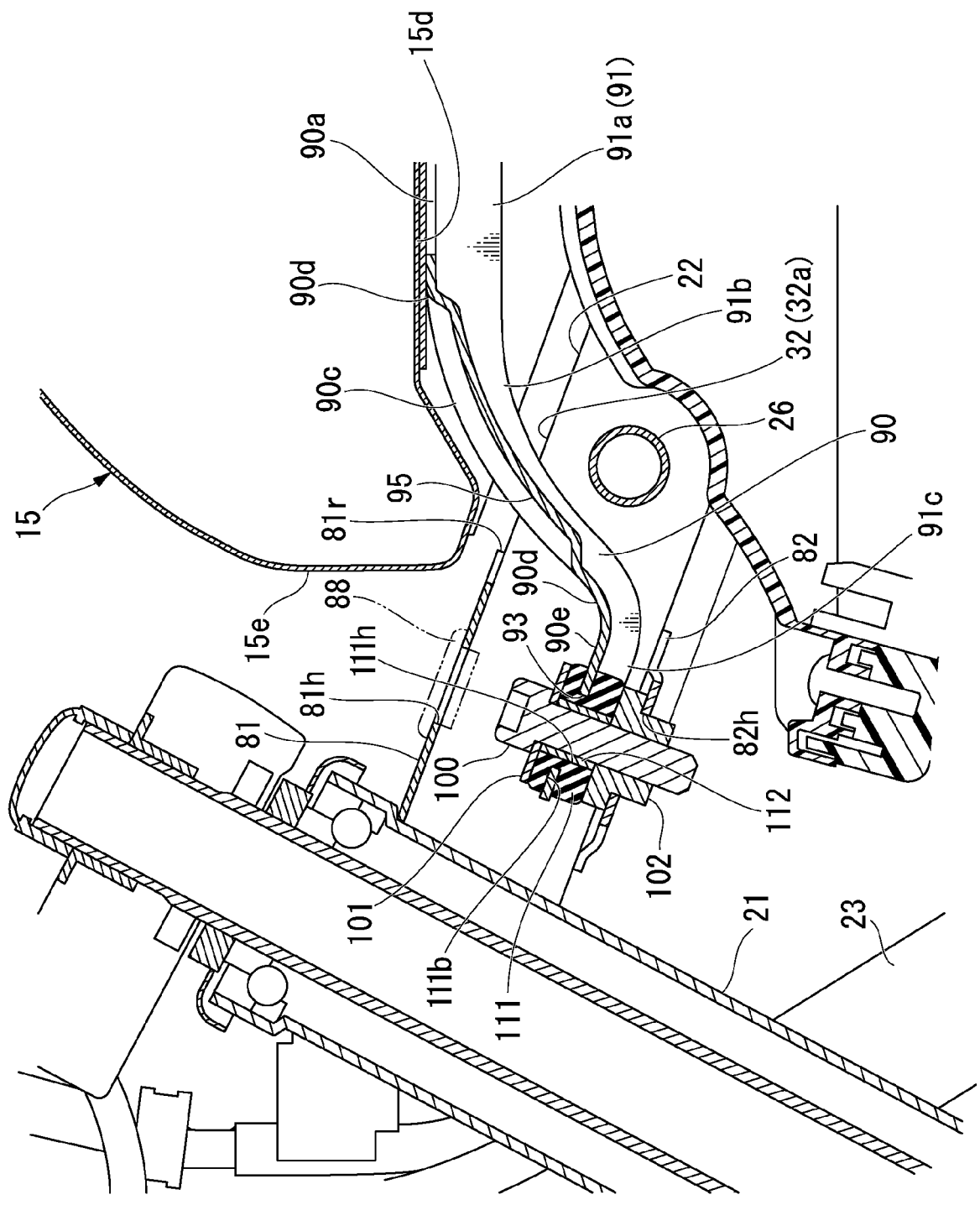
FIG. 5 is an enlarged view of the major part in FIG. 4.
Figure 10:
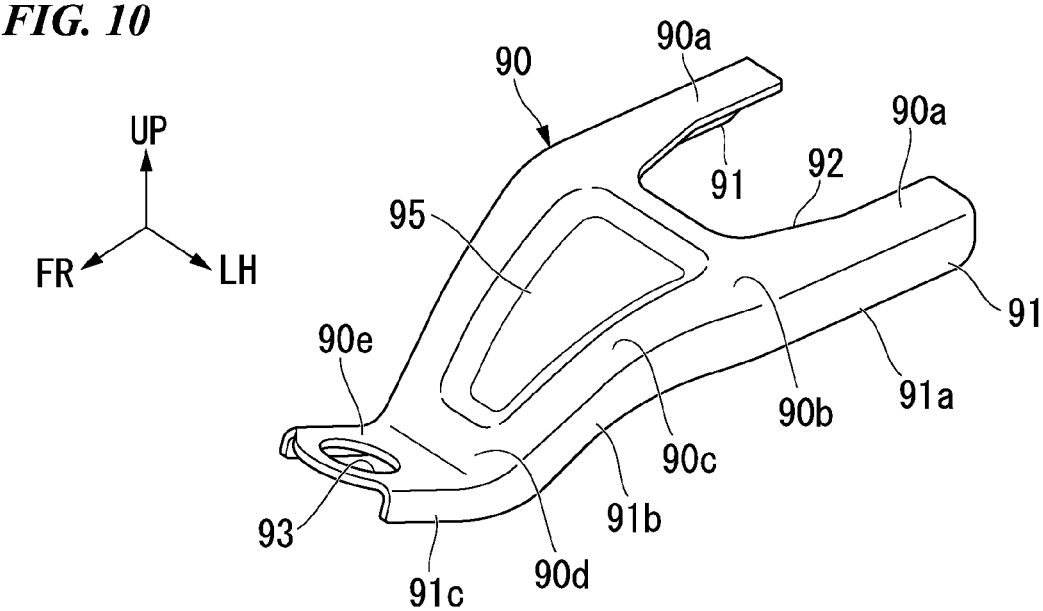
FIG. 10 is a perspective view of a stay provided on a front end portion of the fuel tank.
Figure 11:
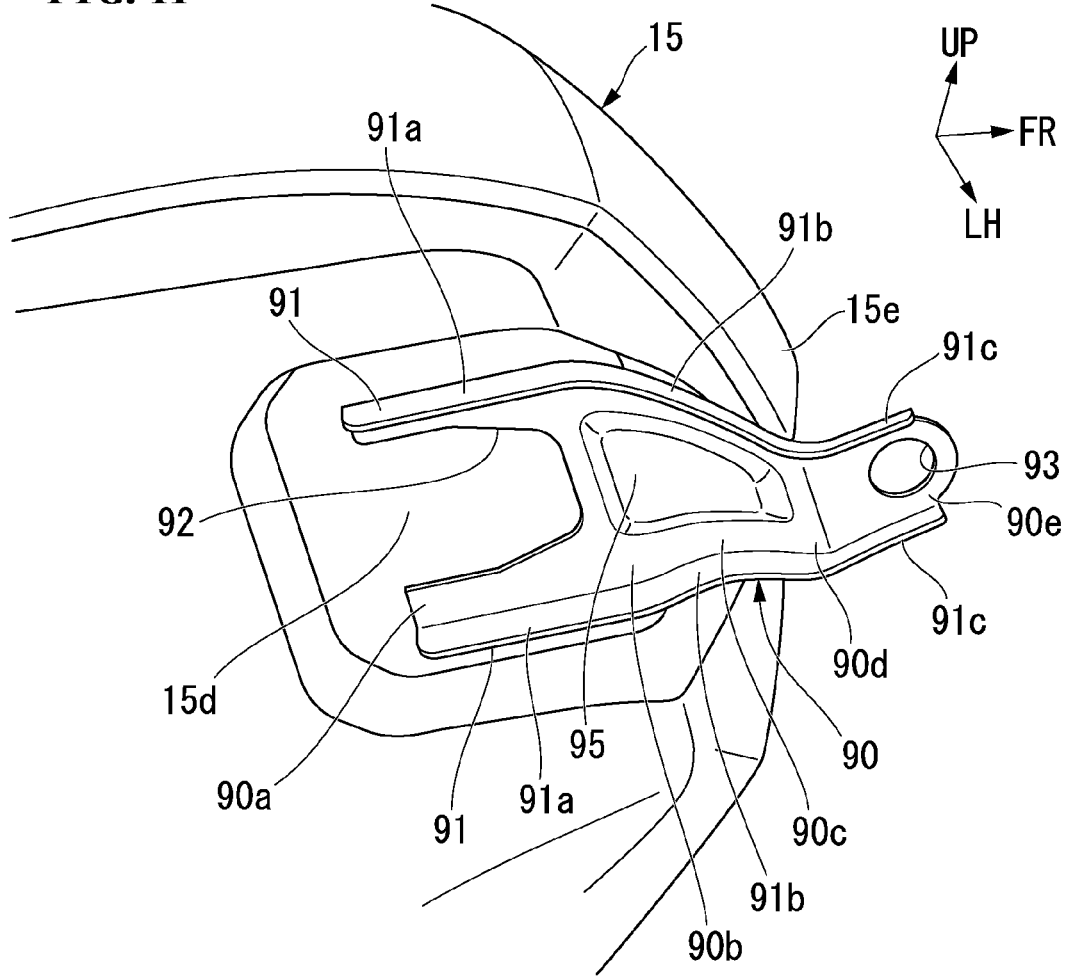
FIG. 11 is a perspective view showing a joining portion of the stay with respect to the fuel tank obliquely from a side therebelow.

Ribs 91 protruding downward are formed in the forward/rearward direction to be continuous with both end portions of the stay 90 in the leftward/rightward direction. As shown in FIG. 5 and FIG. 10, the ribs 91 have rib rear sections 91a disposed at both sides of the base end portion 90a in the leftward/rightward direction that are formed such that a protrusion dimension downward from the base end portion 90a, i.e., a height of the rib rear sections 91a in the upward/downward direction becomes constant.

The ribs 91 have rib intermediate sections 91b disposed at both sides of the inclined extension section 90c in the leftward/rightward direction that are formed such that a protrusion dimension downward from the inclined extension section 90c, i.e., a height of the rib intermediate sections 91b in the upward/downward direction is gradually reduced from the rear toward the front.

The ribs 91 have rib front sections 91c disposed at both sides of the tip portion 90e in the leftward/rightward direction that are formed such that a protrusion dimension downward from the tip portion 90e, i.e., a height of the rib front sections 91c in the upward/downward direction becomes constant.

The stay 90 has a width dimension in the leftward/rightward direction on the side of the tip portion 90e at the front thereof, which is smaller than that on the side of the base end portion 90a at the rear thereof. The stay 90 has a cross-sectional area on the side of the tip portion 90e at the front thereof, which is smaller than that on the side of the base end portion 90a at the rear thereof when seen in a cross-sectional view perpendicular to the forward/rearward direction. Accordingly, the stay 90 has strength that is higher on the side of the base end portion 90a than on the side of the tip portion 90e.

A notch section 92 recessed in substantially a U shape from the rear end of the stay 90 toward the front when seen in a plan view is formed in the base end portion 90a of the stay 90. The base end portion 90a extends rearward from the inclined extension section 90c into a pair of left and right portions due to the notch section 92. The inclined extension section 90c is formed such that a width dimension in the leftward/rightward direction is gradually reduced from the rear toward the front when seen in a plan view. A reinforcement concave section 95 recessed downward is formed at an inner side of the inclined extension section 90c in the leftward/rightward direction. The reinforcement concave section 95 is formed continuously in the forward/rearward direction. The reinforcement concave section 95 is formed such that a width dimension in the leftward/rightward direction is gradually reduced from the rear toward the front when seen in a plan view.

The tip portion 90e has a circular locking hole 93 formed in a central section in the leftward/rightward direction and passing in a plate thickness direction.

The stay 90 is formed of, for example, a steel plate through pressing. The base end portion 90a of the stay 90 is joined to a lower surface (a reinforcement plate) of the pedestal section 15d of the fuel tank 15 through, for example, arc welding. Here, in the base end portion 90a, not only an outer circumferential edge portion but also a circumferential edge portion of the U-shaped notch section 92 is welded to the pedestal section 15d. Accordingly, a welding margin (a welding bead length) of the stay 90 is secured, and the stay 90 is strongly joined to the fuel tank 15. The reinforcement plate is joined to the lower surface of the pedestal section 15d through, for example, spot welding.

Figure 6:
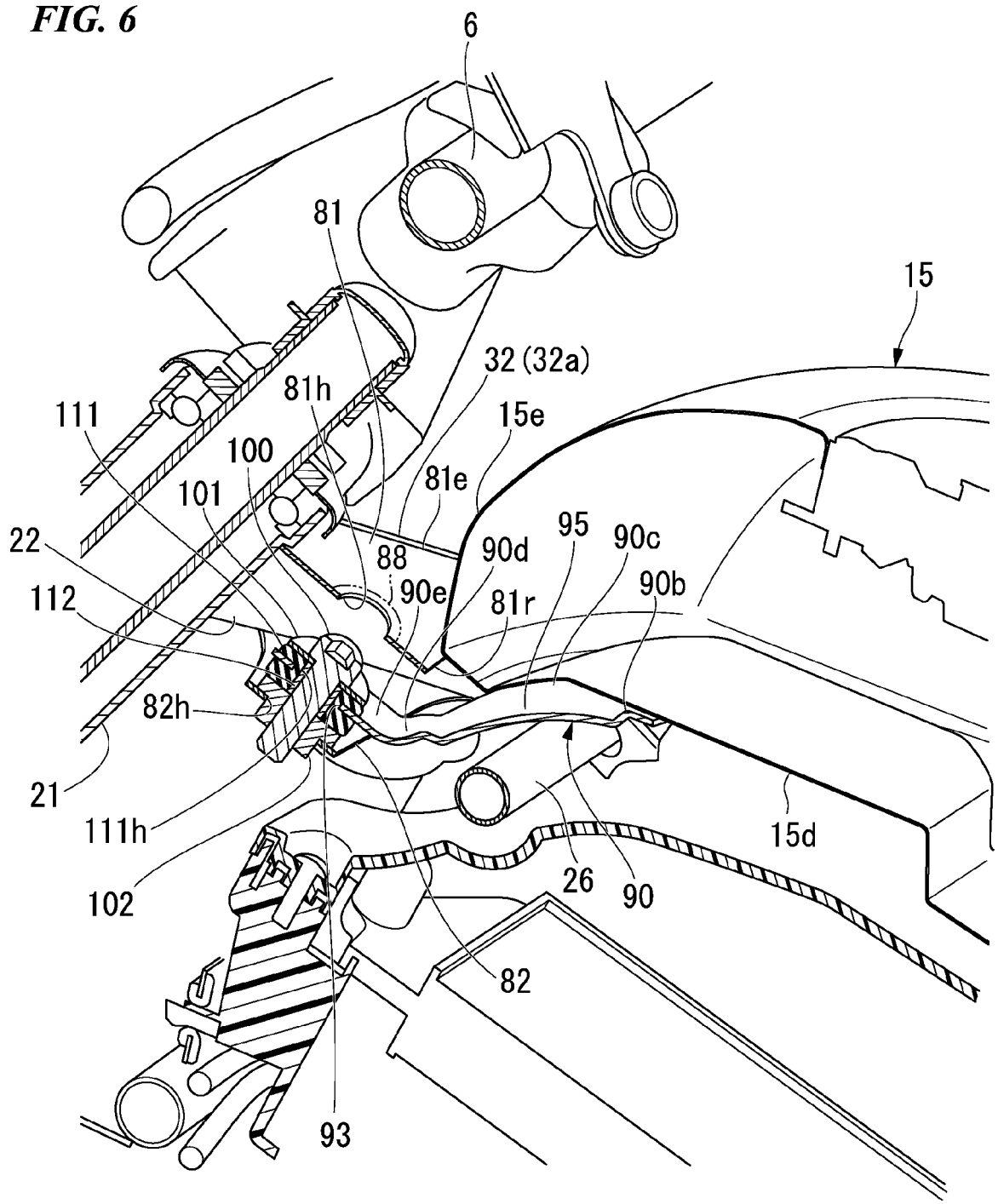
FIG. 6 is a perspective view including a cross section of the lateral center of the major part of the motorcycle.
Figure 6:
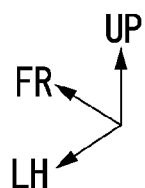

As shown in FIG. 5 and FIG. 6, in a state in which the stay 90 is joined to the fuel tank 15, the tip portion 90e of the stay 90 protrude further forward than a front end 15e disposed at the foremost side of the fuel tank 15. The front end 15e of the fuel tank 15 is disposed further forward and upward with respect to the vehicle than a rear end 81r of the upper gusset plates 81.

The inclined extension section 90c of the stay 90 is inserted below the upper gusset plates 81 through a gap between the upper gusset plates 81 and the first cross frame 26. The tip portion 90e of the stay 90 is fastened to the lower gusset plates 82 by a fastening bolt (a fastening member) 100 via a grommet 111 and a collar 112 below the upper gusset plates 81.

The grommet 111 is formed in a cylindrical shape, and includes a through-hole 111h passing through an axial center section thereof in the axial direction, and an annular slit 111b formed in an intermediate section of an outer circumferential surface in the axial direction and continuous in a circumferential direction around an axial center. The grommet 111 is formed of a rubber-based material. An inner circumferential edge portion of the locking hole 93 of the stay 90 is fitted onto the annular slit 111b of the grommet 111.

The collar 112 has a cylindrical shape through which a lower neck of the fastening bolt 100 can pass, and is formed of a metal material. The collar 112 is inserted into the through-hole 111h of the grommet 111.

Figure 12:
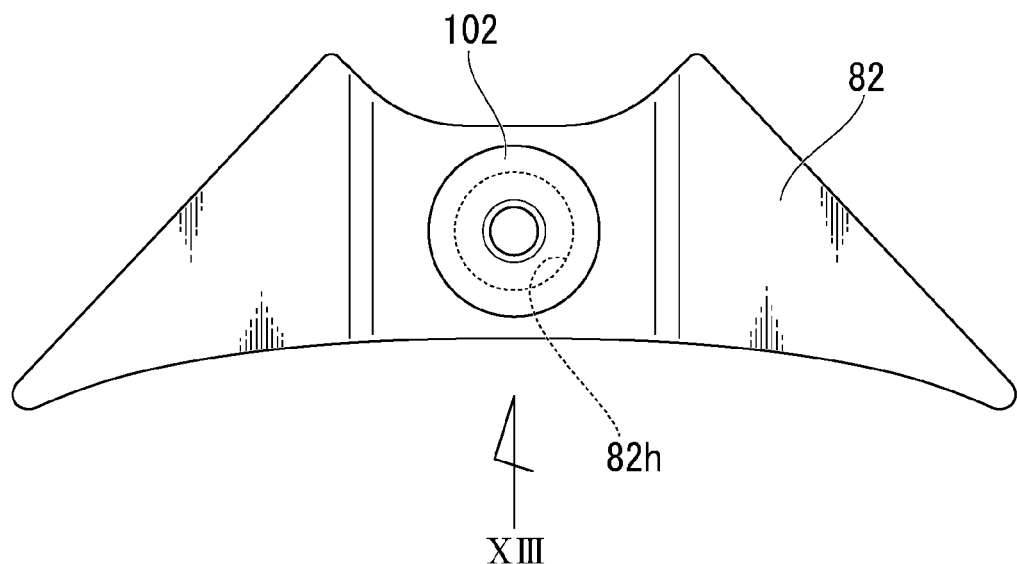
FIG. 12 is a plan view of a lower gusset plate of the vehicle body frame.
Figure 13:
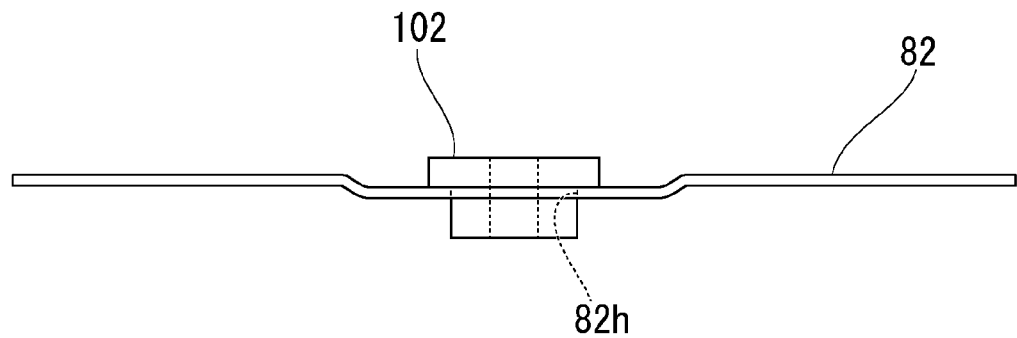
FIG. 13 is a view taken along an arrow XIII in FIG. 12.

As shown in FIG. 12 and FIG. 13, a through-hole 82h passing in the plate thickness direction of the lower gusset plate 82 is formed in a central section of the lower gusset plate 82. A nut member (a section to be fastened) 102 disposed coaxially with the through-hole 82h is joined to the lower gusset plate 82 through, for example, welding.

As shown in FIG. 5 and FIG. 6, the fastening bolt 100 is inserted through the collar 112 inserted into the grommet 111 from above in a state in which a flat washer 101 formed of a metal is interposed between an upper end surface of the grommet 111 and the fastening bolt 100. The fastening bolt 100 is screwed and fastened into the nut member 102 fixed to the lower gusset plates 82. The collar 112 is fastened and fixed onto the lower gusset plate 82 by the fastening bolt 100 and the nut member 102 in a standing state. The stay 90 is supported by the collar 112 via the grommet 111. That is, the stay 90 (in addition to the front end portion of the fuel tank 15) is mounted on the lower gusset plates 82 via a rubber member using the fastening bolt 100 or the like.

Figure 7:
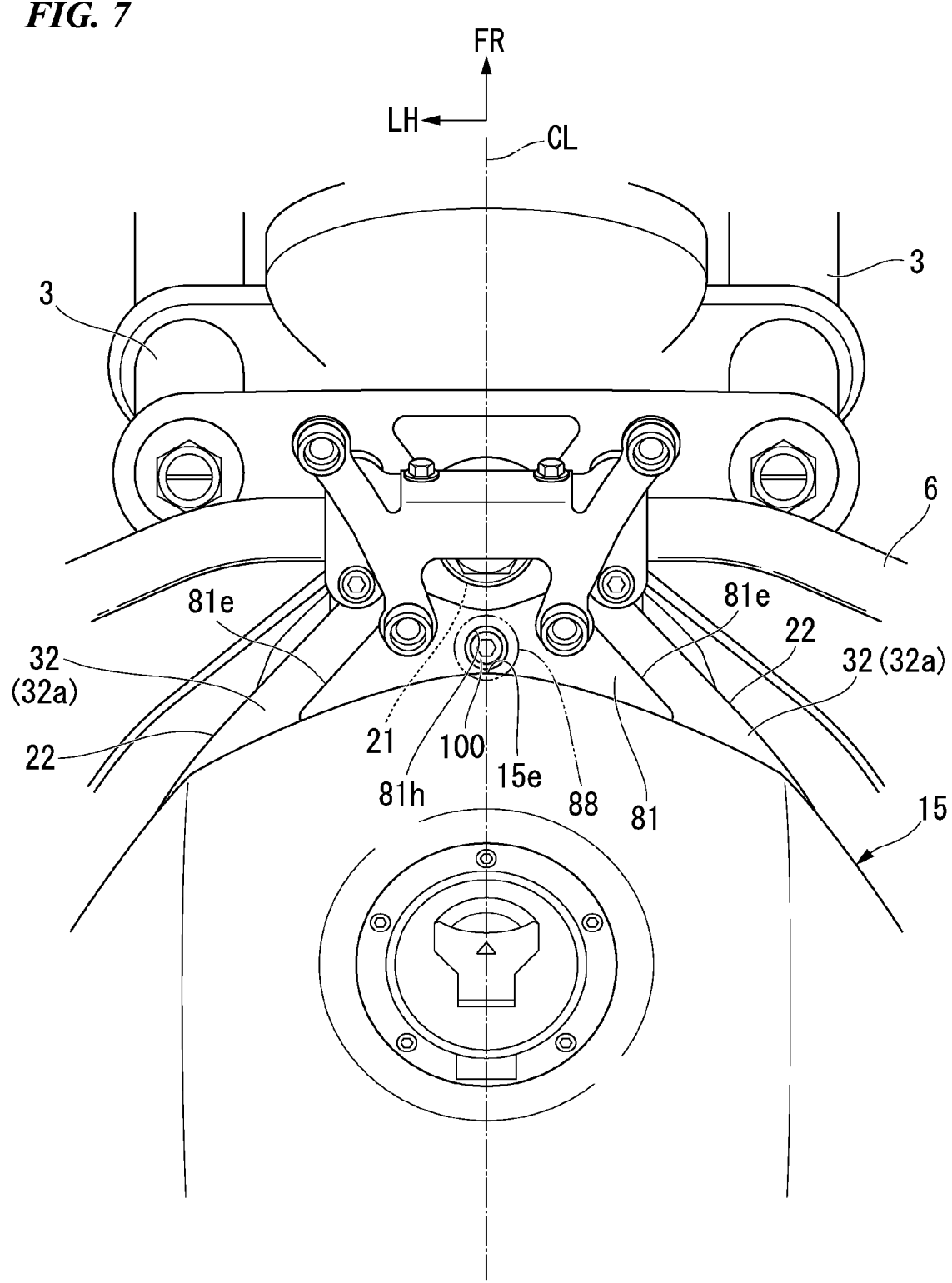
FIG. 7 is a plan view of a vicinity of a front end portion of a fuel tank of the motorcycle.

As shown in FIG. 4 to FIG. 7, an insertion hole 81h passing in the plate thickness direction and through which a tool for rotating a head section of the fastening bolt 100 around a bolt shaft can be inserted is formed in the central section of the upper gusset plate 81. As shown in FIG. 5 and FIG. 7, the insertion hole 81h is exposed in front of the front end 15e of the fuel tank 15. The fastening bolt 100 can be fastened or loosened by, for example, inserting a socket section of the socket wrench through the insertion hole 81h and rotating the socket section from above the upper gusset plate 81. As shown in FIG. 5 to FIG. 7, a cover member 88 configured to cover the insertion hole 81h can be mounted in the insertion hole 81h. The cover member 88 is formed of, for example, a resin-based material, a rubber-based material, or the like. The cover member 88 is being normally mounted in the insertion hole 81h and can be removed from the insertion hole 81h and the tool can be inserted through the insertion hole 81h when a detachment work of the fuel tank 15 is performed.

The cover member 88 can have design properties. That is, the cover member 88 may have, for example, a vehicle name of the motorcycle 1, a maker name, various logos, and the like, while having a degree of freedom in shape. Accordingly, design properties can be enhanced in a state in which the cover member 88 is mounted.

As described above, the motorcycle 1 of the embodiment includes the head pipe 21, the pair of left and right main frame pipes 32 extending rearward from the head pipe 21, the fuel tank 15 supported on the pair of left and right main frame pipes 32, the upper gusset plates 81 disposed in front of the fuel tank 15 with respect to the vehicle, provided above the pair of left and right main frame pipes 32 and configured to cover the pair of left and right main frame pipes 32, the lower gusset plates 82 provided below the upper gusset plates 81 with an interval, the stay 90 extending from the fuel tank 15 toward the front of the vehicle and attached to the lower gusset plates 82 below the upper gusset plates 81, and the fastening bolt 100 configured to detachable fasten the lower gusset plates 82 and the stay 90.

According to the configuration, the stay 90 extending forward from the fuel tank 15 is attached to the lower gusset plates 82 by the fastening bolt 100 or the like at below the upper gusset plates 81 configured to cover a space between upper sides of the pair of left and right main frame pipes 32. Accordingly, an upper side of the portion of the stay 90 configured to fasten the stay 90 to the lower gusset plates 82 is covered with the upper gusset plates 81. Accordingly, exposure of the portion of the stay 90 fastened to the lower gusset plates 82 toward above the vehicle is suppressed. As a result, contact between external elements such as tools, other articles, or the like, and the fastening portions of the stay 90 and the lower gusset plates 82, during manufacturing of the vehicle, a maintenance work, or the like, is suppressed. For this reason, damage to the external elements and the fastening portions from each other can be suppressed. In addition, the fastening portion of the stay 90 to the vehicle body configured to support the front end portion of the fuel tank 15 cannot be easily seen from an occupant or the like who rides on the motorcycle 1, and design properties around the front end portion of the fuel tank 15 can be increased.

In addition, the nut member 102 to which the fastening bolt 100 is fastened is provided on the lower gusset plate 82. Accordingly, the fastening bolt 100 may be fastened to the nut member 102 provided on the lower gusset plate 82. Accordingly, in comparison with the case in which a separate nut member is used, fastening work of the fastening bolt 100 and the nut member 102 can be easily and reliably performed.

In addition, the insertion hole 81h for a tool is formed in the upper gusset plate 81. Accordingly, the tool configured to fasten the fastening bolt 100 can access to the lower gusset plates 82 through the insertion hole 81h. Accordingly, fastening work or the like between the stay 90 and the fastening bolt 100 disposed below the upper gusset plate 81 can be easily performed.

In addition, the cover member 88 configured to cover the insertion hole 81h is further provided. Accordingly, since the insertion hole 81h is covered with the cover member 88 except when the tool is inserted through the insertion hole 81h, design properties can be increased while suppressing exposure of the fastening bolt 100 and occurrence of rust or the like due to wetting of the fastening bolt 100 or the like by rain water.

In addition, the upper gusset plates 81 connect the pair of left and right main frame pipes 32 behind the head pipe 21. Accordingly, the upper gusset plate 81 that is a reinforcement element of the vehicle body frame 20 can be used as a plate member that hides the fastening portion between the stay 90 and the fastening bolt 100. Accordingly, an increase in the number of parts can be minimized.

In addition, the lower gusset plates 82 connect the pair of left and right main frame pipes 32 behind the head pipe 21. Accordingly, the lower gusset plate 82 that is the reinforcement element of the vehicle body frame 20 can be used as a lower member that fastens the stay 90. Accordingly, an increase in the number of parts can be minimized.

In addition, the stay 90 passes through a space between the upper gusset plates 81 and the first cross frame 26 and is disposed below the upper gusset plates 81. In this way, since the stay 90 passes through the space between the first cross frame 26 and the upper gusset plates 81 provided behind the upper gusset plates 81, the stay 90 can be efficiently disposed using the limited space.

In addition, the stay 90 extends in the vehicle forward/rearward direction, and the longitudinal intermediate section of the stay 90 is made as the inclined extension section 90c curved in an arc shape when seen in a side view, and the inclined extension section 90c has the reinforcement concave section 95 recessed toward at least one of the sides above and below. Accordingly, rigidity of the stay 90 can be effectively increased, and the fuel tank 15 can be strongly supported.

In addition, the front end 15e of the fuel tank 15 in the forward/rearward direction of the vehicle is disposed further forward and upward than the rear end 81r of the upper gusset plate 81. Accordingly, the fastening portion between the stay 90 and the fastening bolt 100 cannot be easily seen from an occupant who rides on the motorcycle 1. As a result, design properties can be enhanced.

In addition, the fastening portion of the stay 90 configured to support the fuel tank 15 having a large influence to the vehicle appearance cannot be easily seen, and design properties can be further enhanced.

Further, the present invention is not limited to the above-mentioned embodiments described with reference to the accompanying drawings, and various variants may be considered without departing from the technical scope of the present invention.

For example, in the embodiment, while the upper side of the portion configured to fasten the stay 90 and the lower gusset plates 82 using the fastening bolt 100 is covered with the upper gusset plates 81 that function as the reinforcement elements of the pair of left and right main frame pipes 32, there is no limitation thereto. For example, the upper side of the portion configured to fasten the stay 90 and the lower gusset plates 82 using the fastening bolt 100 may be covered with the cover member (the plate member) other than the upper gusset plates 81. The pair of left and right vehicle body frame elements (the main frame pipes 32) connected by the upper gusset plates 81 do not matter whether it is "main" or not and whether it is "pipe" or not.

In addition, in the embodiment, while the stay 90 is attached to the lower gusset plates 82 below the upper gusset plates 81, there is no limitation thereto. For example, a lower member configured to attach the stay 90 may be provided in addition to the lower gusset plates 82 that function as the reinforcement elements of the pair of left and right main frame pipes 32. Further, the lower member may be provided in addition to the main frame pipes 32, and may be constituted by, for example, a bracket or the like extending rearward from the head pipe 21.

In addition, in the embodiment, while the nut member 102 is welded to the lower gusset plates 82, the nut member 102 may be separate from the lower gusset plates 82. Further, instead of the nut member 102, the lower gusset plate 82 itself may include a female screw hole forming section configured to fasten the fastening bolt 100.

In addition, in the embodiment, while the fuel tank 15 is supported by the stay 90, in addition to the fuel tank 15, an air cleaner box, an article accommodating box, a tank cover (a vehicle body cover), a steering damper (steering system parts), a battery box, various electric parts or the like, and other vehicle configuration parts can also be supported on the pair of left and right main frame pipes 32 according to the same configuration as above.

In addition, all vehicles on which a driver rides on the vehicle body are included as the saddle riding vehicle, and in addition to a motorcycle (including a motorized bicycle and a scooter-type vehicle), a three-wheeled vehicle (including a two-front-wheeled and one-rear-wheeled vehicle in addition to one-front-wheeled and two-rear-wheeled vehicle) or a four-wheeled vehicle may also be included, and a vehicle in which an electric motor is included in a prime mover may also be included.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A saddle riding vehicle comprising:
a head pipe;
a pair of left and right vehicle body frame elements extending rearward from the head pipe;
a fuel tank supported on the pair of left and right vehicle body frame elements;
a plate member that is disposed in front of the fuel tank with respect to the vehicle, that has edge portions at both end portions thereof in the leftward/rightward direction that are integrally joined to an upper surface of the pair of left and right vehicle body frame elements above the pair of left and right vehicle body frame elements and that is provided between the pair of left and right vehicle body frame elements;
a lower member that is provided below the plate member at an interval therefrom and that is provided between the pair of left and right vehicle body frame elements;
a stay that extends below the plate member toward a front side of the vehicle from the fuel tank and that is attached to the lower member; and
a fastening member configured to detachably fasten the lower member and the stay,
wherein an insertion hole, through which a tool configured to fasten the fastening member to the lower member is able to be inserted, is formed in the plate member.

2. The saddle riding vehicle according to claim 1, wherein a section to be fastened to which the fastening member is fastened is provided on the lower member.

3. The saddle riding vehicle according to claim 1, further comprising a cover member that is detachably mounted on the insertion hole and that is configured to cover the insertion hole.

4. The saddle riding vehicle according to claim 1, wherein the plate member is an upper gusset plate that is disposed behind the head pipe with respect to the vehicle and that is configured to connect the pair of left and right vehicle body frame elements.

5. The saddle riding vehicle according to claim 1, wherein the lower member is a lower gusset plate that is disposed behind the head pipe with respect to the vehicle and that is configured to connect the pair of left and right vehicle body frame elements.

6. The saddle riding vehicle according to claim 1, wherein a connecting member that is disposed behind the plate member with respect to the vehicle and that is configured to connect the pair of left and right vehicle body frame elements is provided, and
the stay is disposed below the plate member through a space between the plate member and the connecting member.

7. The saddle riding vehicle according to claim 1, wherein the stay extends in a forward/rearward direction of the vehicle, and
a longitudinal intermediate section of the stay is curved in an arc shape when seen in a side view, and a reinforcement concave section recessed toward at least one of the sides above and below is formed in the longitudinal intermediate section.

8. The saddle riding vehicle according to claim 1, wherein a front end of the fuel tank in the forward/rearward direction of the vehicle is disposed in front of and above a rear end of the plate member with respect to the vehicle.

* * * * *